United States Patent [19]

Nurse, Jr.

[11] Patent Number: 5,591,331
[45] Date of Patent: Jan. 7, 1997

[54] FILTER DEVICE INCLUDING A HOUSING WITH REMOVABLE SIDEWALLS HAVING A FILTERING CAPACITY

[76] Inventor: Harry L. Nurse, Jr., 10409 Watterson Trail, Louisville, Ky. 40299

[21] Appl. No.: 436,105

[22] Filed: May 8, 1995

[51] Int. Cl.$^6$ .................. B01D 29/62; B01D 29/96
[52] U.S. Cl. ............... 210/232; 210/323.1; 210/357; 210/486; 210/495
[58] Field of Search ..................... 210/232, 234, 210/238, 239, 357, 435, 437, 457, 485, 497.01, 499, 323.1, 486, 495

[56] References Cited

U.S. PATENT DOCUMENTS

| | | |
|---|---|---|
| 2,900,084 | 8/1959 | Zabel . |
| 3,332,552 | 7/1967 | Zabel . |
| 4,040,901 | 8/1977 | Leisure ............................. 210/323.1 |
| 4,439,323 | 3/1984 | Ball . |
| 4,710,295 | 12/1987 | Zabel . |
| 5,223,134 | 6/1993 | Riva ....................................... 210/232 |
| 5,382,357 | 1/1995 | Nurse . |
| 5,402,809 | 4/1995 | Smith . |
| 5,409,606 | 4/1995 | Spencer ................................. 210/437 |

Primary Examiner—W. L. Walker
Attorney, Agent, or Firm—Middleton & Reutlinger; Charles G. Lamb

[57] ABSTRACT

A filter device for separating solid material from a liquid includes a filter housing with vertically extending removable sidewalls wherein at the location of the removable sidewalls E-shaped connections are provided to receive two vertically extending sidewalls in spaced parallel relationship whereby a fluid impermeable sidewall may be inserted into the circumferential section of the housing when the liquid permeable section is removed for cleaning without interfering with the continual operation of the filter device. A pump or other apparatus are provided within the housing for removing filtered waste water therefrom.

7 Claims, 3 Drawing Sheets

FILTER DEVICE INCLUDING A HOUSING WITH REMOVABLE SIDEWALLS HAVING A FILTERING CAPACITY

BACKGROUND OF THE INVENTION

The present invention relates in general to filter devices and more particularly relates to improvement in filter devices for waste water discharge systems.

There have been proposed and utilized a number of different filtering devices for separating solid matter from waste water in septic tanks. Most of the devices for removing waste water from septic tanks provides means for allowing the solid materials to settle to the bottom of the tank wherein the solid materials react with bacteria. The by-products of the reaction with the bacteria is then passed through a filtration means to remove the remaining relative small solid particulates therefrom with the waste water being removed by overflow or by discharge pumps into a drain field. One particular device taught in U.S. Pat. No. 4,439,323 provides for a housing disposed within the upper portion of a septic tank wherein the housing is provided with apertures through vertical side walls at selected locations therealong and spaced interiorally of the walls is a fine mesh screen. The spacing between the walls of the housing and the screen is less than the diameter of the openings in the housing wall. Also disposed within the interior of the housing is a means to remove the filtered waste water from the housing by either a positive pressure pump or a syphoning device. However, whenever the screen becomes plugged in the filtration device it is necessary to open up the septic tank, remove the screen for cleaning and after cleaning, replace the screen in the housing. Thus, during the period of time the screen is removed for cleaning and replacing it is necessary for the filtration system to be out of operation.

SUMMARY OF THE INVENTION

An object of the present invention is to provide a filter device for separating solids from a liquid.

Another object of this invention is to provide a filter device for use in a waste water treatment device or septic tank.

Even another object of this invention is to provide a filter device having removable filter means within a housing which can be removed and cleaned during the filtration operation.

More particularly, the present invention provides a filter device for separating solid material from a liquid comprising:

A housing having an open top, a closed bottom and a plurality of vertically extending sidewall sections, at least one of the sidewall sections including a pair of removable vertically extending sidewall members being in spaced relationship, at least one of the removable vertically extending sidewalls being liquid permeable; and, means to remove liquid from the housing.

Briefly, the present invention provides a filter device useful in continuous separation of solid matter from a liquid, such as waste water, wherein the filter device is disposed within a waste water treatment device or septic tank. The location of the filter device is disposed within the upper portion of the septic tank but within the normal level of the waste water. In the operation of a septic tank, most of the solids, or particularly the large, heavier solid materials, settle to the bottom of the tank with the upper portion of the liquid containing only the small or light weight solid particulates which are left in the waste water. In this upper portion of the liquid in the tank the filter device is positioned. The housing for the filter device includes a plurality of sidewall sections circumferentially positioned vertically around the housing, at least some of the sections including filtration means therethrough. These filtration sections are individually removable but prior to removing, means are provided in the walls of the housing for the insertion of a spaced vertically extending member, preferably a blind or liquid impervious section which is inserted to blind off the arcuate portion of the housing where the removable filtration section is to be removed. The filtration section can then be cleaned and reinserted back into the housing without shutting down the operation of the filtration device. It is also realized that another filtration section may be used instead of a blind.

Further objects and advantages of this invention will appear to those skilled in the art from the following description and appended claims, reference being had to the accompanying drawings forming a part of the specification wherein like reference characters designate corresponding parts into several views.

DETAILED DESCRIPTION OF THE PREFERRED EMBODIMENTS

Figure 1:
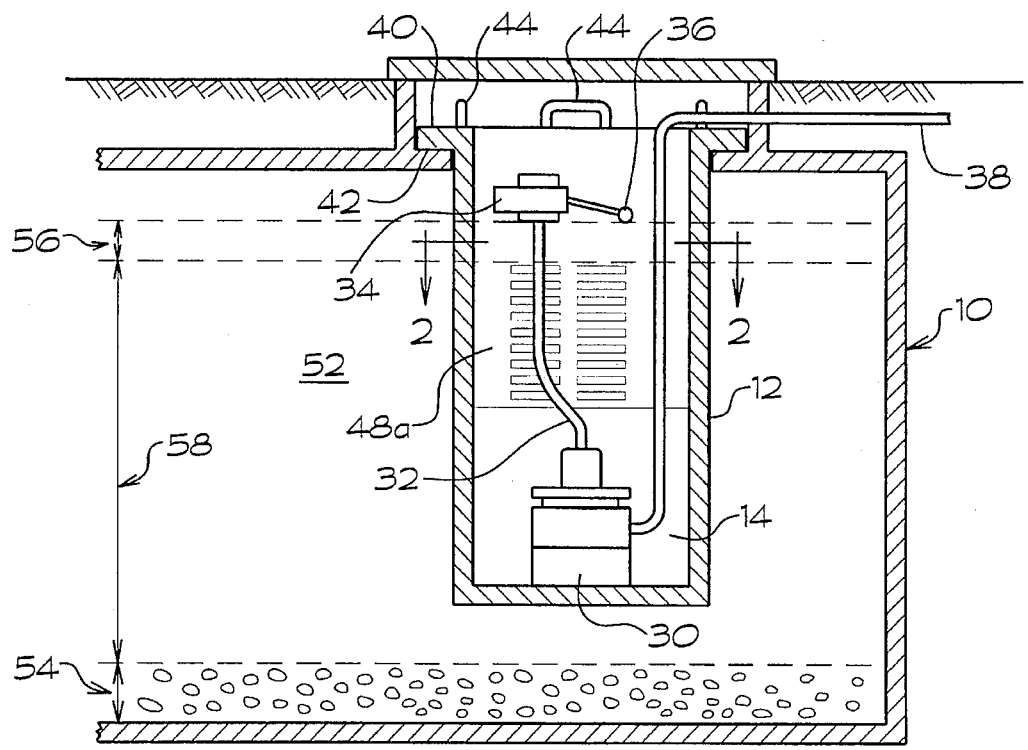
FIG. 1 is a sectional view of one embodiment of the present invention disposed within a septic tank.

Referring to FIG. 1, an open-top, cylindrical filter housing 12 is suspended within a septic tank 10. The housing 12 is provided with a circumferentially extending flange 40 which is mounted onto a circumferentially extending lip 42 of the septic tank. The position of the housing 12 within the septic tank 10 is such that in normal operation, the housing 12 will be partially submerged in waste water 52.

The waste water 52 within the septic tank 10 is generally in three layers. Adjacent the bottom of the septic tank 10 is a layer identified by the numeral 54 comprising a high concentration of solids having a specific gravity greater than that of water. The upper most layer, identified by the numeral 56, comprises a large concentration of floating solids which have a specific gravity less than that of water. Between the solid layer 54 and 56 is a relatively clear liquid or water, this layer being identified by the numeral 58. Filter housing 12 is positioned with liquid permeable sidewall sections being disposed within the relatively clear layer 58.

Figure 2:
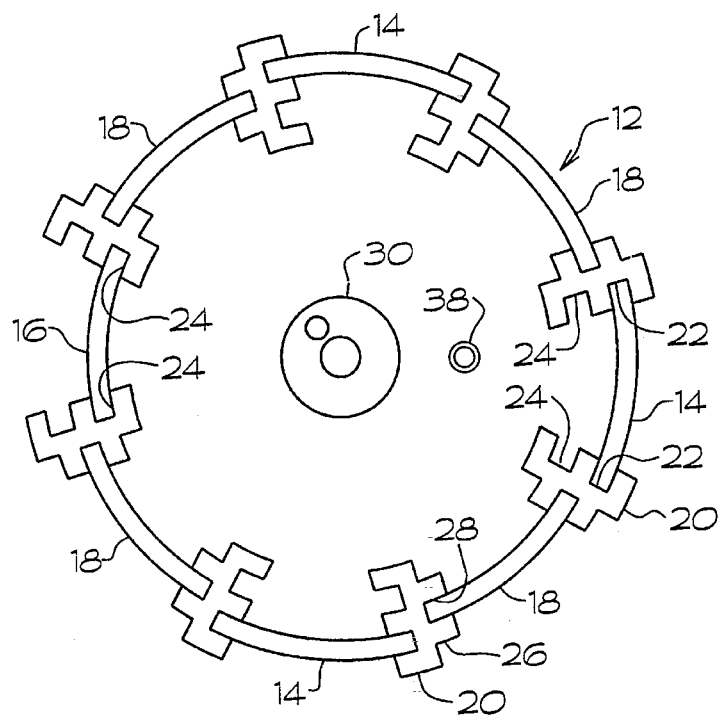
FIG. 2 is an enlarged sectional top view of the embodiment shown in FIG. 1 taken along the line 2—2 of FIG. 1.
Figure 3:
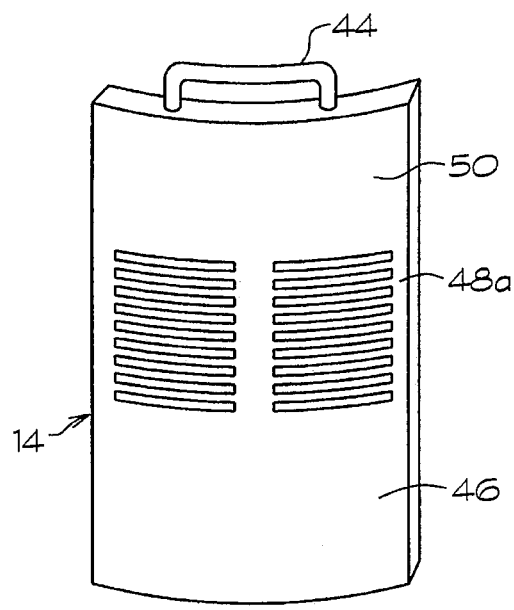
FIG. 3 is a perspective view of one preferred removable fluid permeable sidewall of a housing of the present invention.
Figure 4:
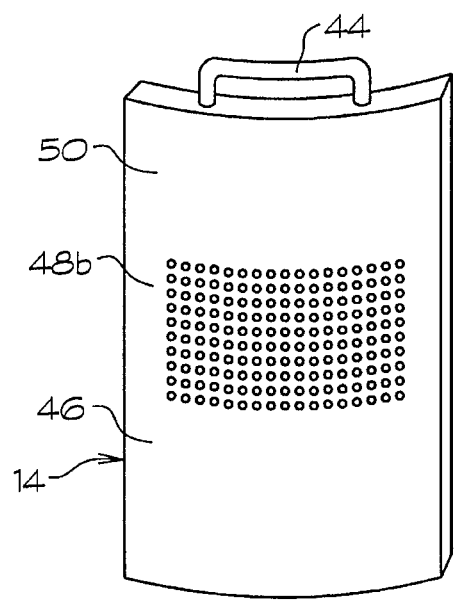
FIG. 4 is a perspective view of another preferred embodiment of a liquid permeable sidewall of a housing of the present invention.

As best shown in FIG. 2, the filter housing 12 is made up of a plurality of vertically extending sidewall sections which extend circumferentially around the housing, each one making up a preselected arcuate segment of the cylindrical walls of the housing 12. In one preferred embodiment, the cylindrically housing 12 is made up of alternating fixedly attached vertically extending sidewall members, and removable vertically extending sidewall members. Fixedly attached sidewall members are identified by the numeral 18 and the removable vertically extending sidewall sections are identified by the numerals 14 and 16. Removable vertically extending sidewall sections 14, as best shown in FIGS. 3 and 4, are provided with liquid permeable portions and liquid impermeable portions. Vertically extending sidewall members 16, as shown in FIG. 5, are substantially liquid impermeable.

Figure 6:
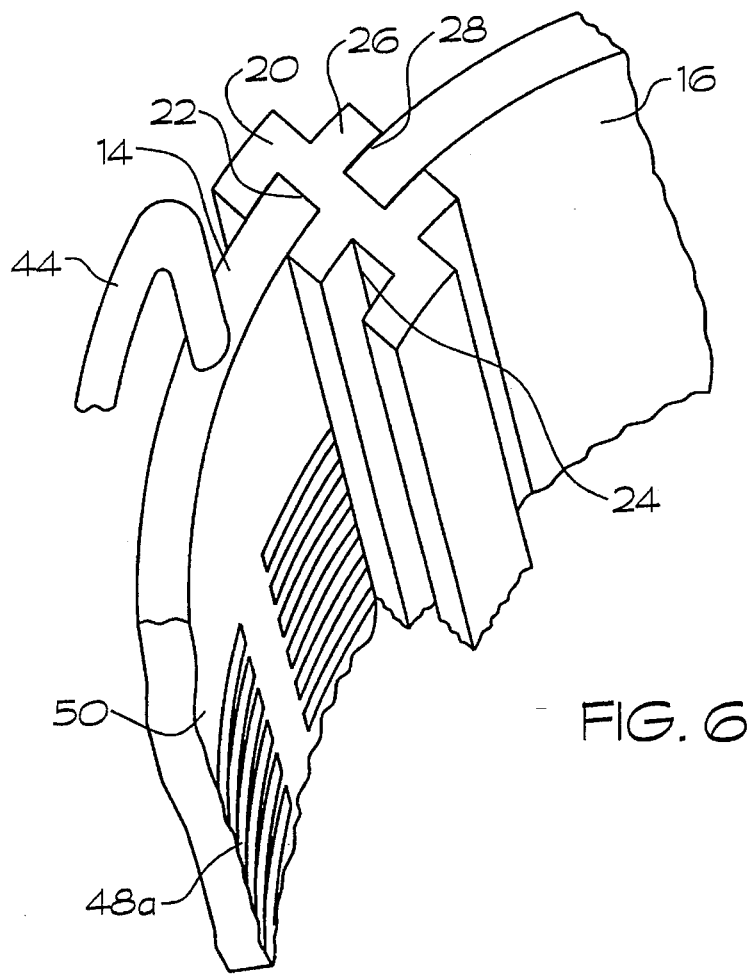
FIG. 6 is an enlarged fragmentary perspective view showing details of the connecting means for the removable vertical sidewall sections of FIGS. 3, 4 and 5 in the housing of a preferred embodiment of the present invention; and, FIG. 7 is an enlarged fragmentary top view of a housing of the present invention showing another preferred connection means for the removable vertical sidewalls for the housing of a preferred embodiment.
Figure 7:
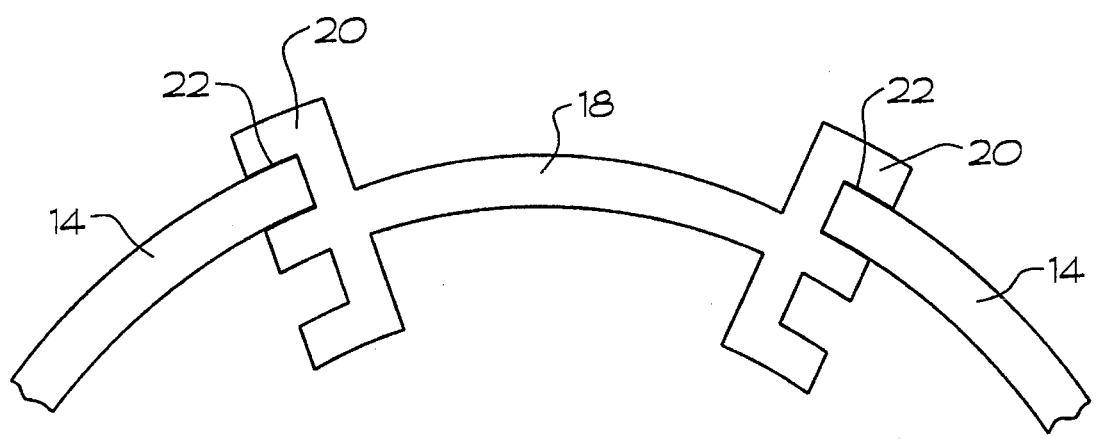

As shown in FIGS. 2 and 6 vertically extending E-shaped sidewall connectors 20 are provided with a vertically extending front groove 22 for receiving a vertical edge of a removable sidewall 14 or 16 and a vertically extending parallel back groove 24 for receiving a vertical edge of a second removable sidewall 14 or 16. Grooves 22 and 24 are of a width substantially the same as the thickness of the removable sidewalls 14 and 16 thereby providing for a close or tight fit of the sidewalls 14 and 16 within the grooves 22 and 24. Moreover, as shown in FIG. 2, E-shaped connectors 20 are disposed at spaced facing relationship at preselected positions along the circumference of the housing 12 and the distance between the facing E-shaped connectors are substantially the width of the removable sidewalls 14 or 16. E-shaped connectors 20 may be fixedly attached or removable. Also, as shown in FIG. 2, between the back sides of the E-shaped connector 20 is a liquid impermeable sidewall 18 which is generally non-removable and unitary with the construction of the canister 12. The back side of the E-shaped connector 20, as shown in FIG. 2, includes a C-shaped holder portion 26 with a vertically extending groove 28 therein for receiving the edges of the sidewalls 18. As shown in FIG. 7, the C-shaped holding portion 26 is not necessary and the sidewalls 18 may be integral with two spaced E-shaped connectors 20.

Figure 5:
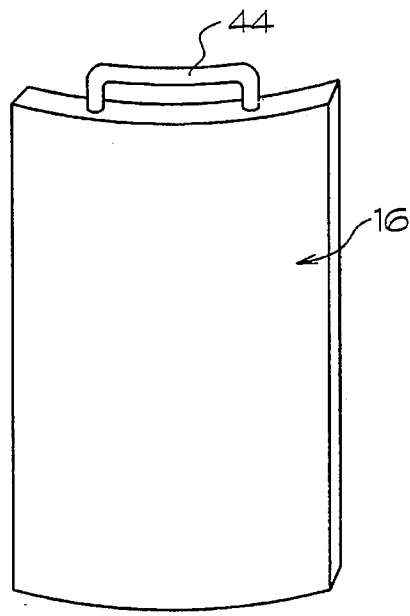
FIG. 5 is a perspective view of a removable fluid impermeable section of a sidewall of the housing of the present invention.

As shown in FIGS. 3, 4, and 5, the removable sidewalls 14 and 16 are provided with handles 44 thereon for easy removal and replacement within the housing 12.

As shown in FIGS. 3 and 4, the removable sidewalls 14 are provided with filter means within a preselected vertical portion of the sidewalls. Particularly, in one preferred embodiment as shown in FIG. 3, the sidewall 14 is divided into substantially three equal vertical sections, the lower section being identified by the numeral 46 which is a liquid impermeable section, a middle section identified by the numeral 48a which is the liquid permeable section, and the upper third section being a fluid impermeable section identified by the numeral 50. As shown in FIG. 3, the fluid permeable section is a plurality of horizontally extending slots having a relatively narrow height generally being from about 1/64" to 1/4" and preferably about 1/32 of an inch for the allowing of clear waste water to pass therethrough and particulate material having a diameter greater than 1/32 of an inch separated from the liquid passing through the slots 48a. In FIG. 4, a fine mesh screen portion 48b is provided and the mesh of the screen is such that particles having one size dimension greater than 1/32" will not pass through.

As shown in FIGS. 1 and 2, a positive pressure pump 30 is provided to remove the filtered waste water from the interior of the housing 12 to a drain field outside the confines of the septic tank 10. The positive pressure pump 30 is operated in response to a level control device 34 which includes a vertically movable float 36 thereon which may be any well-known commercially available level control device and float. The level control device 34 is in electrical communication with the pump 30 through electrical conduit 32 which actuates the pump 30 in response to the location of the float 36. The pump 30 is also provided with a discharge conduit 38 which provides the means for directing the waste water from the housing 12 into a specific location in a drain field or out through other provided laterals.

In the operation of the preferred embodiment, a plurality of liquid permeable removable sidewalls 14 are installed circumferentially at selected locations around the housing 12. As the waste water 52 rises in the septic tank 10, waste water 52 containing particulates smaller than the openings in the sidewall 14 pass through the walls 14 into the interior of the housing 12. As the waste water continues to rise, the float 36 being disposed on the top thereof also rises. At a preselected level of float 36, the level control device 34 actuates the pump 30 thereby draining down the waste water to a preselected level determined by a new lower level of the float 36 at which time the electrical level controller 34 deactivates the pump 30. After a number of operations of filtration, solid material will plug the openings in the liquid permeable sections 48a, 48b of the sidewalls 14 thereby decreasing the efficiency of the operation of the filter device. With the liquid permeable portion of a sidewall 14 being plugged the operator may then insert a liquid impermeable sidewall 16 or another liquid permeable sidewall 14 into one of the pairs of grooves 24 of the E-shaped connector 20. As shown in FIG. 2, the liquid permeable removable sidewalls 14 are received within the front grooves 22 and fluid impermeable removable sidewalls 16 are received within the back grooves 24. Once the removable sidewall 16 has been inserted in place, the removable sidewall 14 which is spaced parallel to the removable sidewall 16, may then be removed and cleaned without interfering with the operation of the unit which includes a number of other liquid permeable sidewalls 14 still in place as shown in FIG. 2. Once the removable sidewall 14 has been cleaned, it may then be reinserted into the appropriate section of the housing 12 and the liquid impermeable removable sidewall 16 parallel thereto and spaced from the recently inserted sidewall 14 removed.

Preferably the housing 12 and all of the sidewalls 14, 16 and 18 as well as the E-shaped connectors are made of suitable molded plastic materials, one preferred plastic material being a molded polypropylene, polyethylene, or the like.

It is realized that various changes may be made by those skilled in the art without departing from the principals and scope of the invention as expressed in the claims appended thereto.

What is claimed is:

1. A filter device in combination with a tank for separating solid material from a liquid wherein the filter device comprises:

a housing having a top, with an opening therein, a closed bottom, and a plurality of vertically extending sidewall sections, at least one of said sidewall sections including means to receive a pair of spaced, parallel removable vertically extending sidewall members, at least one of said removable vertically extending sidewalls being a filter means to retain solids of preselected size from a liquid; and, means to remove liquid from said housing through said opening in said top.

2. The filter device of claim 1, said pair of removable vertically extending sidewall sections being circumferentially aligned with a front sidewall and a back sidewall wherein in a filtering condition one of said sidewalls being liquid permeable, and in a cleaning operation the other of said sidewalls being liquid impermeable.

3. The filter device of claim 1, said sidewall sections being liquid permeable including a plurality of horizontally extending slots.

4. The filter device of claim 3, said horizontally extending slots being from about 1/64" to 1/4 inches in height.

5. The filter device of claim 1, said at least one of said removable vertically extending sidewalls having a lower vertical liquid impermeable section, a middle vertical permeable section and an upward vertical liquid impermeable section.

6. The filter device of claim 5, said lower impermeable section being approximately one-third of the vertical height of said member and said middle liquid permeable section being approximately one-third of the vertical height of said member.

7. The filter device of claim 1, only one sidewall member being received within said means to receive a pair of spaced, parallel removable vertically extending sidewall members.

\* \* \* \* \*